United States Patent [19]

Prigent

[11] Patent Number: 5,668,741
[45] Date of Patent: Sep. 16, 1997

[54] PROCESS AND DEVICE TO CONTINUOUSLY AND IN REAL TIME CONTROL A COMPLEX MANUFACTURING PROCESS

[75] Inventor: Thierry Prigent, Sainte-Helene, France

[73] Assignee: Eastman Kodak Company, Rochester, N.Y.

[21] Appl. No.: 736,306

[22] Filed: Oct. 24, 1996

Related U.S. Application Data

[63] Continuation of Ser. No. 156,754, Nov. 23, 1993, abandoned.

[30] Foreign Application Priority Data

Nov. 26, 1992 [FR] France .................. 92 14680

[51] Int. Cl.$^6$ ......................................... G05B 23/00
[52] U.S. Cl. ........................... 364/551.01; 364/552
[58] Field of Search ............ 364/551.01, 551.02, 364/552, 508, 572, 576, 550, 185, 186, 468.15, 468.16, 468.17, 474.11, 474.16, 474.17, 474.19

[56] References Cited

U.S. PATENT DOCUMENTS

| | | | |
|---|---|---|---|
| 4,060,716 | 11/1977 | Pekrul et al. | 364/576 |
| 5,005,142 | 4/1991 | Lipchak et al. | 364/550 |

FOREIGN PATENT DOCUMENTS

| | | | |
|---|---|---|---|
| 510677 | 4/1992 | European Pat. Off. | |
| 2605170 | 10/1986 | France | H04Q 9/00 |
| WO81/03702 | 12/1981 | Germany | |
| 3734487 | 10/1987 | Germany | G07C 11/00 |

Primary Examiner—Emanuel T. Voeltz
Assistant Examiner—M. Kemper
Attorney, Agent, or Firm—Susan L. Parulski

[57] ABSTRACT

The invention relates to the continuous monitoring of a manufacturing process. Channels continuously inspect fundamental elements of the manufacturing process in order to detect any changes in the products or machine. The data is processed in each channel by frequency estimators and then analyzed in order to detect major variations and to trigger an alarm signal. A monitor analyzes the various alarm signals to correlate them with expected changes in order to accept these alarms and to record the state of the manufacturing process when the alarms relate to aberrant phenomena.

10 Claims, 7 Drawing Sheets

PROCESS AND DEVICE TO CONTINUOUSLY AND IN REAL TIME CONTROL A COMPLEX MANUFACTURING PROCESS

This application is a Continuation of U.S. Ser. No. 08/156,754 entitled PROCESS AND DEVICE TO CONTINUOUSLY AND IN REAL TIME CONTROL A COMPLEX MANUFACTURING PROCESS by Thierry Prigent, filed on Nov. 23, 1993 now abandoned.

FIELD OF THE INVENTION

The present invention relates to the monitoring of a complex manufacturing process, and more particularly to a continuous monitoring so as to apprehend all the transient or perturbing phenomena which may occur during manufacture.

BACKGROUND OF THE INVENTION

It has been proposed to monitor manufacturing equipment continuously. The documents FR-A-2 312 060 and FR-A-2 605 170 are examples of the techniques used. As indicated in many documents which deal with such monitoring of complex equipment, the aim is to be able to monitor the progressive wear of the equipment in order to be able to use the machine to its maximum capability and to avoid stoppage due to the breakage of a component or stoppage for preventive changing of a component still in a state of functioning. Wear is a relatively slow progressive phenomenon and monitoring can in general be provided by alternating scrutiny of the various sensors.

The invention proposes to use continuous monitoring of machines not only for detecting breakdowns but also to check the quality of production. It can therefore be seen that the aim is different. In fact, temporary random perturbations may occur on the equipment and cause transient phenomena which may impair the quality of the product manufactured.

In fact, it is well known that in equipment for manufacturing a photographic product, the noise vibration at the meniscus of the coating machine changes the thickness of the coating deposited with the frequency of the sound wave without impairing the operation of the equipment. A phenomenon of this type, when it appears temporarily, will not necessarily be detected by scrutiny by means of the various sensors. This is why, in the present description, it will be considered that the acquisition and processing are executed in "real time" when all the samples provided without interruption by an analog-to-digitial converter are processed and analysed, even if the results of the calculations are delivered with a certain perfectly calculatable delay or phase shift.

The document FR-A-2 605 170 describes the monitoring of complex equipment by the use of several sensors disposed at essential points in the equipment and the digital recording of the signals describing the phenomenon for the purpose of their subsequent processing by an analyzer. The monitoring proposed cannot therefore be considered to be monitoring in real time within the meaning of the present application.

The document FR-A-2 312 060 describes automatic monitoring apparatus in which the fundamental components of the equipment are monitored by a sensor associated with a channel. In this document it is mentioned that the analysis is carried out in real time. However, because of the architecture and mode of functioning of the monitoring apparatus, which automatically and successively selects each channel having a single analysis device, the processing of each sensor takes into account only a very limited portion of the signal and cannot be considered to be processing in real time as defined above. Moreover, the sensors are connected to the analysis unit by cables which may be as long as 150 m. Such lengths of cable in an industrial environment may cause distortions in the signal reaching the analyzer. Such distortions may result from the addition of noise or even significant stray signals.

SUMMARY OF THE INVENTION

One of the aims of the invention is therefore to be able to monitor a manufacturing process continuously in order to be able to apprehend all the transient or perturbing phenomena.

Another aim of the invention is to provide monitoring equipment in which the signals coming from the sensors are not perturbed by external phenomena before analysis.

Another aim of the invention is to provide equipment in which the minimum number of signals are transmitted to the monitor in order not to overload the equipment with redundant information. The invention also aims to be able to have available all the data relating to the manufacturing process when an abnormality appears at a particular sensor.

The invention also has the advantage of being able to have available all the data relating to the manufacturing process when changes in a certain number of sensors leads to the appearance of an abnormality.

Another aim is to minimise the volume of information processed and/or stored at the monitor in order to give a high degree of resolution when an aberrant event is detected.

Another aim is to be able to act on the controls of the machine or on the product in order to obtain, in the short term, either a change of command or rejection of the product, and in the long term, through analysis of the manufacturing process, either modification of the manufacturing process or a new formulation of the product or repair or modification of the machine.

In order to achieve the various aims of the invention, first of all the fundamental elements of the manufacturing process which it is desired to monitor will be determined. Each fundamental element will be the subject of isolated processing in a channel and its monitoring will be provided by a particular sensor with particular monitoring parameters.

In order to limit the external perturbations affecting the signal coming from the sensor to the greatest possible extent, the links between the sensor and the analog-to-digital converter responsible for making this signal discreet will be reduced to the maximum possible extent.

As has already been indicated, the invention aims to allow study of the manufacturing process in delayed time when an abnormality has been detected. Such a study can be carried out if an historical recording of the sensors has been effected and stored in each of the channels. If it is desired to analyze the phenomenon over a period of approximately two minutes and the frequency analysis has been carried out from samples obtained at a sampling frequency of 1024 Hz, the transmission of the data relating to a single sensor requires a flow of 2.5 megabits/s in order not to lose any data. In order to limit the data passing over the network, according to the invention each channel is equipped with a frequency estimator for processing the signals coming from the sensor and transforming the time-related values into values which are a function of the frequency. These values are then taken up at the channel so as to be analyzed and the result of this analysis, which comprises a much more limited number of data, is sent over the network to one or more monitors.

The invention aims to provide a method for the continuous monitoring of a complex manufacturing process, in order to apprehend, in a continuous and complete manner, the transient or perturbing phenomena occurring during this process, a method in which at least the fundamental elements of this process are disposed in separate channels situated in the immediate vicinity of the machine so that each one is continuously monitored by a sensor and are connected to at least one remote work station, through a local network, and which comprises on the one hand the steps carried out in each channel in the immediate vicinity of the sensor and consisting of:

a) translating a fundamental element into an analog signal by means of a sensor fixed to the machine;

b) making the analog signal discreet with a frequency determined in relation to the fundamental element associated with the said channel in order to obtain a succession of digital values representing the instantaneous values of the said analog signal as a function of the time;

c) simultaneously,
  1) storing the digital values corresponding to the analog signal in the form of series of N values, and
  2) processing a preceding series of M digital values where $M \geq N$, the processing of the said preceding series being carried out by the use of spectral estimation techniques making it possible to transform the signal variations with respect to time into values which are a function of the frequency, and then storing the said values which are a function of the frequency, d) analyzing the said values which are a function of the frequency in order to obtain objective characteristics depending on the said series of M values processed and the number of characteristics of which is less than N;

e) storing the said objective characteristics, f) comparing the said objective characteristics corresponding to the series of M signals either with given values or with the objective characteristics corresponding to one or more of the preceding series so as to provide a result of the comparison; and g) transmitting the result of the comparison over the said local network; and on the other hand the steps at the said remote work station, consisting of h) receiving the said result of the comparison for each channel for the purpose of observation and use in real time with optionally storing of the said results of the various comparisons in each channel and/or of the said objective characteristics and/or of the said series of N digital values so as to be able to carry out subsequently an analysis in delayed time over all the fundamental elements of the said complex process.

The invention also relates to equipment for the continuous monitoring of a complex manufacturing process, in order to apprehend, continuously and completely, any transient or perturbing phenomena occurring during this process, equipment comprising:

a) at least one remote monitor designed to receive signals in real time making it possible to analyze and/or observe the state of the manufacturing process;

b) a local network designed to convey the information to the monitor;

c) separate channels each associated with a fundamental element of the manufacturing process, these channels being disposed in the immediate vicinity of the sensor and each comprising:

1) a sensor enabling the fundamental element associated with it to be monitored continuously and continuously transforming the state of the said fundamental element into an analog signal;

2) an analog-to-digital converter situated in the immediate vicinity of the said sensor and receiving the said analog signal in order to transform this analog signal into a succession of digital values representing the instantaneous state of the said fundamental element as a function of time;

3) a signal processing device for simultaneously, on the one hand, storing the succession of the said digital values in the form of series of N values and on the other hand processing the digital values corresponding to the preceding series for the purpose of transforming the time-dependent variations represented by the succession of M digital values into signals representing the frequency-dependent variations of the said analog signal, and then, after processing, storing the said signals representing the frequency-dependent variations;

4) an analyzer receiving the said signals representing the frequency-dependent variations in order to transform them into a limited number, less than N, of objective characteristics;

5) a memory for storing the said objective characteristics corresponding to a given number of series of M digital values;

6) means for comparing the said objective characteristics either with given values or with the objective characteristics corresponding to one or more series of M previous signals so as to provide a result of the comparison and transmit the said result over the said local network.

BRIEF DESCRIPTION OF THE DRAWINGS

Other characteristics and advantages of the invention will be clear from a reading of the following description and an examination of the accompanying drawing in which.

DETAILED DESCRIPTION OF THE INVENTION

Up till now the development of the monitoring of machines had the fundamental aim of detecting future breakdowns for the purpose of optimising maintenance shutdowns. However, wear on a machine is progressive and continuous monitoring in real time is essential. The invention proposes to check, continuously, not only the machine but also the fundamental elements of the manufacturing process in order to be able to analyze and correlate data relating to this manufacturing process; which makes it possible to derive continuously the level of quality of the product after processing.

Figure 1:
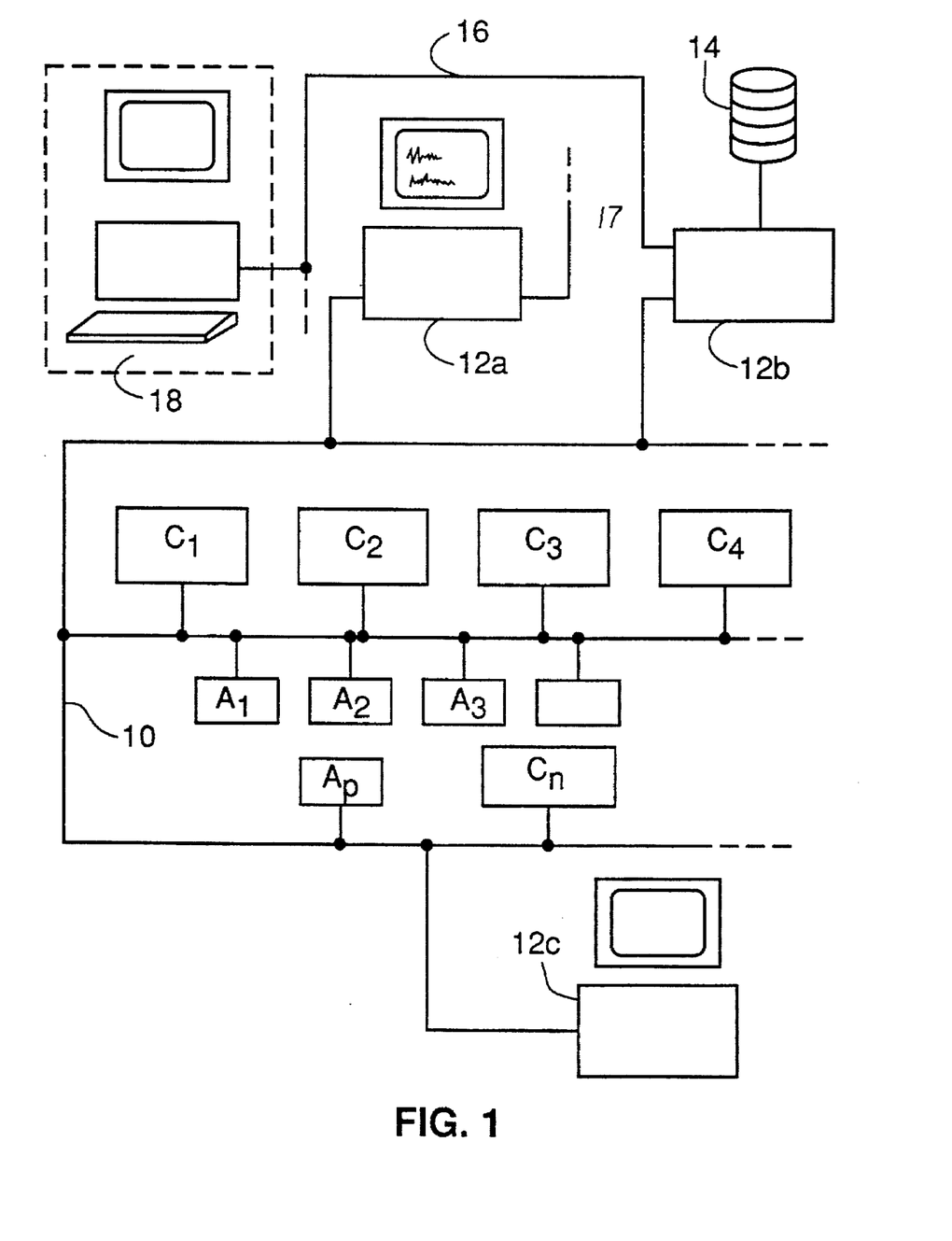
FIG. 1 shows diagrammatically the architecture of monitoring equipment according to the invention.

Reference will be made first of all to FIG. 1, which shows diagrammatically monitoring equipment according to the invention. This equipment monitors a complex manufacturing process continuously. The manufacturing process is carried out by a machine in order to transform a raw material into a final product. In order to be able to monitor the manufacturing process, sensors are used which monitor the machine and the product at any stage in its processing. The disposition and nature of each of the sensors are chosen so as to be able to monitor a fundamental element in the manufacturing process. Thus temperature, pressure, tension, vibration, illumination, thickness, speed, flow rate, electrical charge, potential, optical density or viscosity sensors may be used, together with any other type of sensor which may be judged useful for monitoring one of the fundamental elements of the manufacturing process.

According to the invention, each sensor forms part of a channel $C_1, C_2, \ldots, C_n, \ldots$, the structure of which will be described subsequently. Each channel sends a signal over a network 10 in a manner well known in the art. This signal then reaches monitors 12a, 12b, 12c, the functioning and usefulness of which will be seen later.

The network 10 can be any type of local network, for example FILBUS, described in particular in Control Engineering of October 1987, or in Minis and Micros No 313 of Dec. 19, 1988. The network can also be the FIP network described in the draft standards NF C46-601 to NF C46-607. An FIP network consisting of a screened twisted pair operating at 2.5 MHz has been used, but it is obvious that the data could also be transmitted over optical fibers at 5 MHz as recommended by FIP in a particular embodiment.

The monitors 12a, 12b, 12c are equipped with suitable cards, for example an FIP coupler card (Cegelec® cc 105) so as to be connected to the network in order to receive the data supplied by all the channels $C_1, C_2, \ldots, C_n, \ldots$. Advantageously, the monitors 12a and 12c may take the form of microcomputers of the PC 486 type or similar. This makes it possible in particular to analyze the data received and to correlate the data coming from the various sensors. The monitor 12b may consist of a microcomputer of the PC 486 type or similar. Advantageously, this monitor makes it possible to feed a data base 14 so as to collect data relating to the manufacturing process and to set up a history for the purpose of subsequent use if necessary to study slow or cyclic deviations as a function of external parameters. It is obvious that, in order to be able to carry out correlations between signals coming from different sensors or to set up a history which can be used subsequently, each spectrum or signal will have to be accompanied by a synchronisation signal coming for example from a single clock internal to the system. The monitors automatically determine the time taken by the product to pass from a given sensor to another sensor as a function of the speed of movement of the product, which can be measured by other sensors. The monitor 12b can be equipped with a network card of the IEEE 802 type so as to be able to interrogate the database in real time, through a network 16, by means of a remote work station 18, which can be a DEC® station operating under WINDOWS®.

Figure 2:
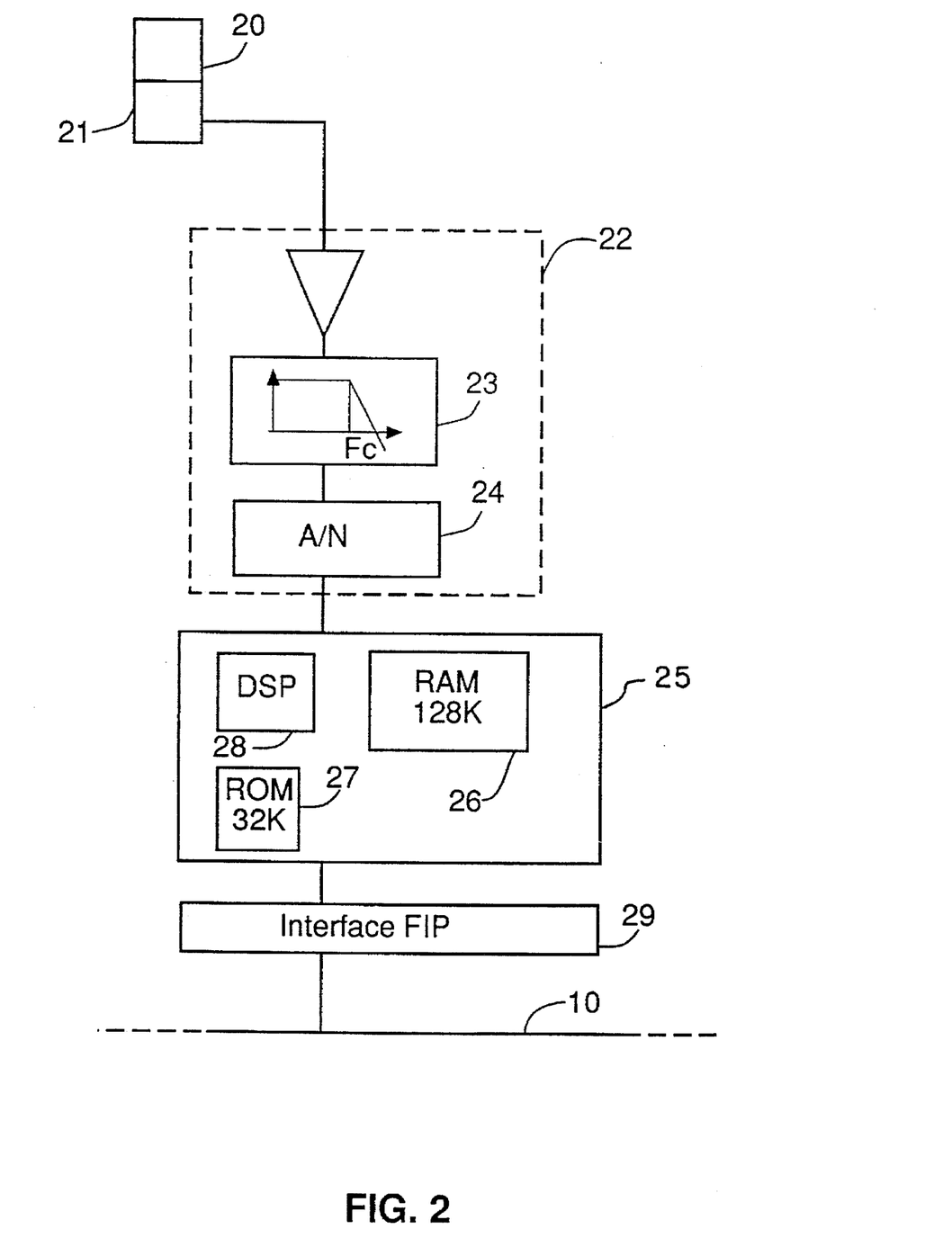
FIG. 2 shows diagrammatically the various components situated in each of the channels.

Reference will now be made to FIG. 2, in which the various components making up each channel and enabling the sensor to be connected to the network 10 are shown diagrammatically. As stated before, a sensor 20 is chosen so as to transform the physical phenomenon to be monitored into an analog electrical signal. It is obvious that the sensor 20 is associated, as is well known, with conditioners 21 for supplying a signal with a relatively high amplitude of, for example, between ±100 mV and ±10 V, so as to be able to reach an analog-to-digital converter situated at a short distance (of the order of 1 meter at the maximum) without being perturbed to a significant extent.

Figure 3A:
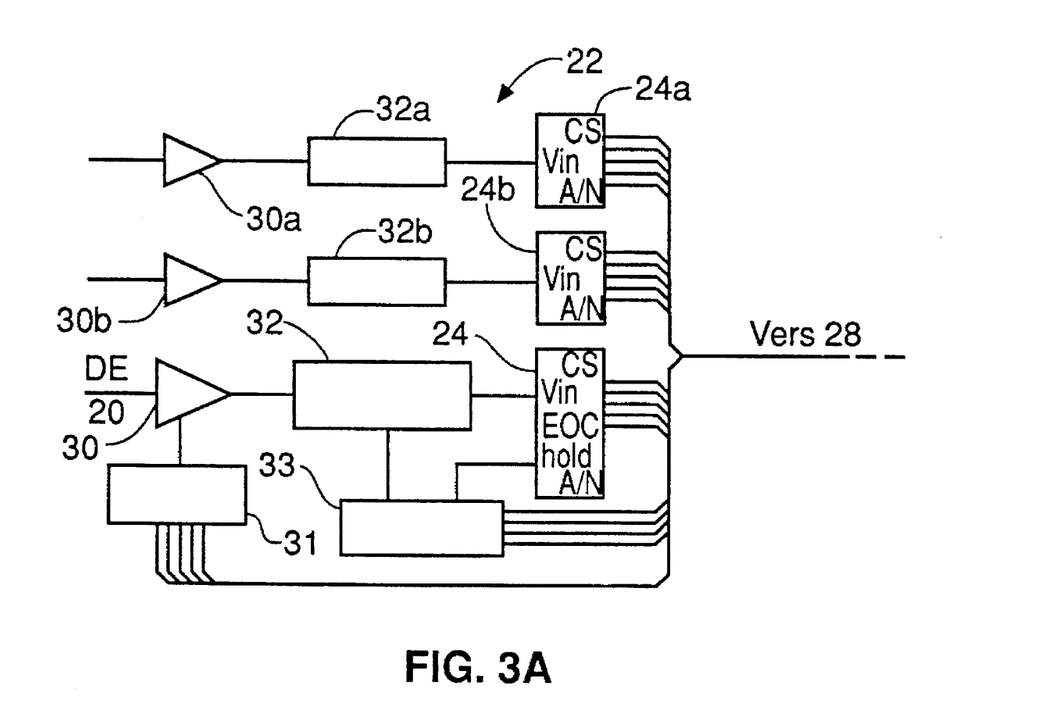
FIG. 3A shows diagrammatically the elements situated in each channel enabling the analog signal to be transformed into digital values representing the analog signal.

As can be seen in FIG. 2, the signal coming from the sensor is sent to a circuit 22 transforming the analog signal coming from the sensor 20 into a digital signal. In order to limit the stray noise which could occur over the link between the sensor 20 and circuit 22, the analog-to-digital circuit is disposed as close as possible to the sensor 20. In a particularly advantageous embodiment, the parameters with influence on the measurement are also supplied to the converter so as to be able to take account of the influences external to the sensor on the measurement carried out by the sensor 20. Details of the circuit 22 will be described subsequently with reference to FIG. 3. The circuit 22 comprises an anti-aliasing filter so as to meet the Shannon conditions relating to sampling and a converter 24 which provides a digital output signal as a function of the amplitude of the analog input signal.

Figure 4:
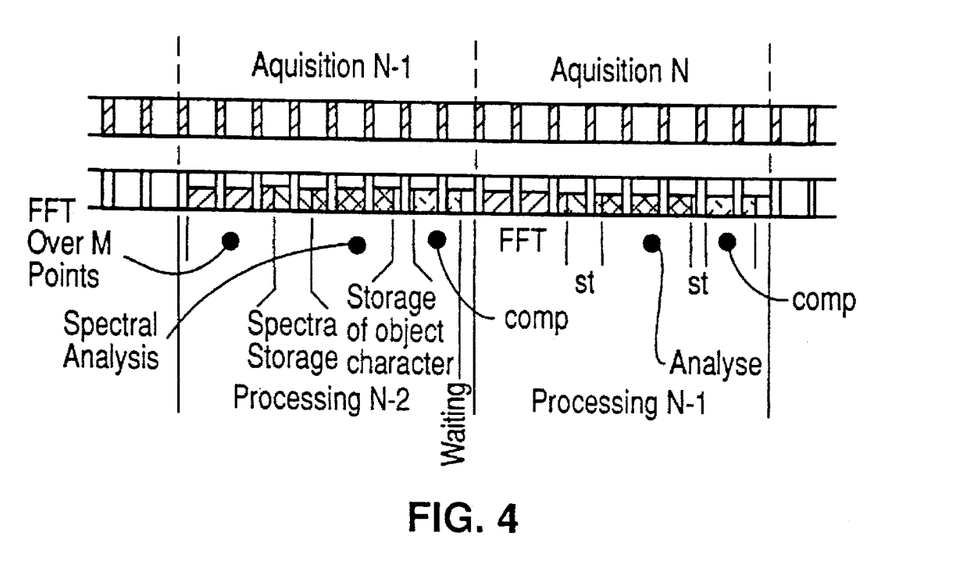
FIG. 4 shows the sequencing of the sampling and computing operations provided by each channel.

The digitized signal is then sent to a circuit 25 in order to be stored in a RAM 26 under the control of a microprocessor 28. Because of the particular use envisaged, the microprocessor used is a DSP 56001 manufactured by MOTOROLA®. The signal is acquired in real time as shown in FIG. 4 and as will be explained in more detail later. Advantageously, the memory 26 is a circular memory which can be obtained by means of a pointer involving a modulo function.

During the acquisition of a series of n samples the processor carries out calculations on a previous series of m samples. In a particular embodiment, the processor 28 uses, as a spectral estimator, the discrete Fourier transform and more particularly the algorithm proposed in 1965 by COOLEY and TUKEY. In a case of a discrete signal x(n), with n being an integer belonging to [0; N−1], obtained by sampling a continuous signal x(t), the discrete Fourier transform is defined by $$X(k) = \sum_{n=0}^{N-1} x(n) \cdot e^{-2\mu i k n/N} \quad (1)$$

in which: k belongs to [0; N−1] and |X(k)| represents the discrete spectrum of amplitude x(n). This relation is symmetrical and gives X(k)=X(N−k) X (N−k). It suffices therefore to retain the values over the interval [0; N/2].

In order to obtain 512 useful points on each spectrum, the Fourier transform must be calculated from 1024 points. The domain of the useful spectrum therefore extends from 0 Hz to Fe/2 Hz, in which Fe is the sampling frequency used and the resolution is Fe/1024.

As is well known, the signals sampled can be modified in order to avoid the problems related to the time limitation of the signal, such as for example the Gibbs phenomenon. The signal x(n) in equation (1) is replaced by $$x'(k) = x(k) \cdot fn(k) \quad (2)$$

in which fn (k) may take different values over [0; N].

The absence of filtering in the observation window corresponds to:

fn(k)=1 for k∈ [0; N]
0 for k∉ [0; N]

Blackman proposed to use a filtering obtained by fn (k)=0,5—0.5 cos (2 μk/N) for K∈[0; N]
0 for k∉[0: N]

whilst-Hanning proposed fn (k)=0,54-0,46 cos (2 μk/N) for K∈[0; N]
0 for k∉[0; N]

Figure 5A:
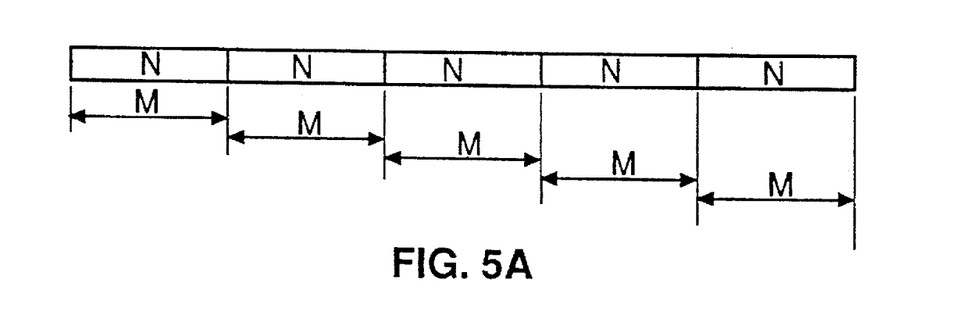
FIGS. 5A and 5B show diagrammatically the sequencing of the operations of acquisition of n samples and the sequence of samples used by the processor to carry out its calculations respectively when the number of samples processed is equal to the number of samples acquired and when the number of samples processed is greater than the number of samples acquired.
Figure 5B:
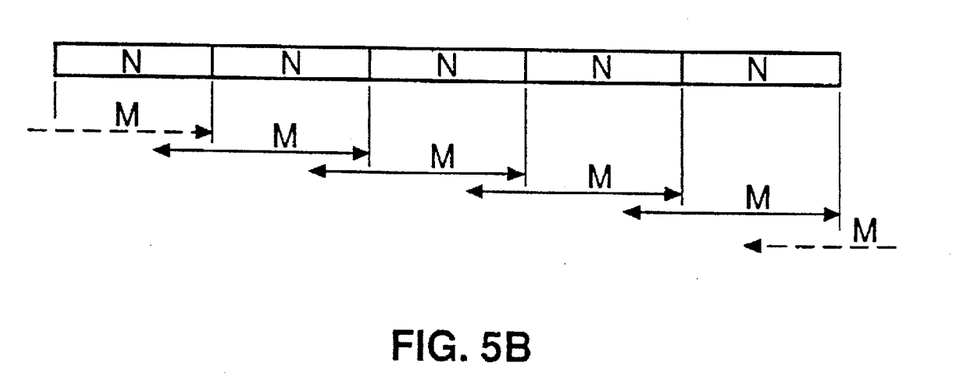

These last two filterings have the well known advantage of improving the spectral resolution to the detriment of accuracy in relation to amplitude. It is obvious that the calculations are carried out in parallel to the process of making the signal discrete at the sampling frequency. Since this analog/digital transformation is never interrupted, it will be necessary to provide for the storage of at least two complete samples of 1024 points. In order better to locate the rapid variations in the frequency of the signal, instead of carrying out the calculations over successions of samples which do not overlap, as shown in FIG. 5A, successions of samples which partially overlap can be used, as shown in FIG. 5B.

After obtaining a spectrum, the processor records it in a given part of the RAM 26 with a view to its subsequent use either by the processor or by the monitors. As can be seen in FIG. 2, the circuit 25 is connected to a communication logic 29 which makes it possible to transmit the data coming from the processor 28 over the network 10. This logic may consist of an FIP coupler card produced in accordance with the recommendations of the FIP club.

It is obvious that the processor can advantageously be programmed to calculate various statistical functions over successive series of spectra such as a spectrum of the mean amplitudes associated with each frequency, a spectrum of the maximum or minimum amplitudes associated with each frequency, a spectrum of the standard deviations of the amplitudes associated with each frequency, a spectrum of the medians of the amplitudes associated with each frequency, a spectrum of the ranges of amplitudes associated with each frequency and a spectrum of the limits of confidence of the amplitudes associated with each frequency, etc, and to transmit these statistical elements over the network to the monitor 12b for the purpose of storing in the database 14. It is obvious that the processor 28 can be programmed to process the same type of statistical functions in relation to the other objective characteristics, and in particular in relation to the frequency associated with the maxima of the peaks and in relation to the width of the peaks. It is obvious that the processor 28 can also supply the integral of the base noise. These statistical elements can be sent at a given frequency, for example every ten minutes, either automatically or at the request of the monitor 12b.

Figure 6A:
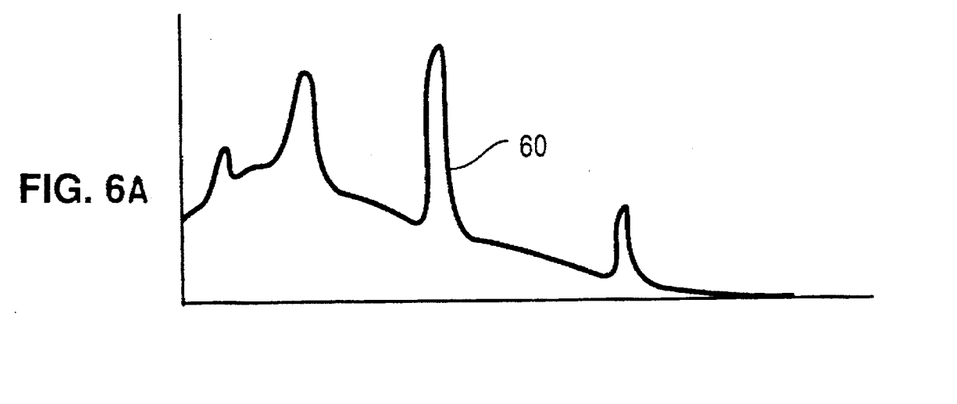
FIGS. 6A–6C show spectra having four frequency peaks and its breakdown into a base noise on the one hand and four peaks on the other hand.
Figure 6B:
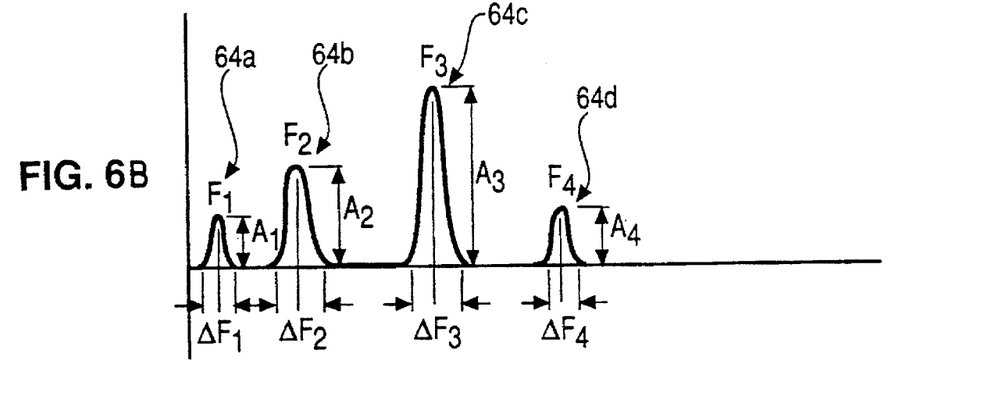
Figure 6C:
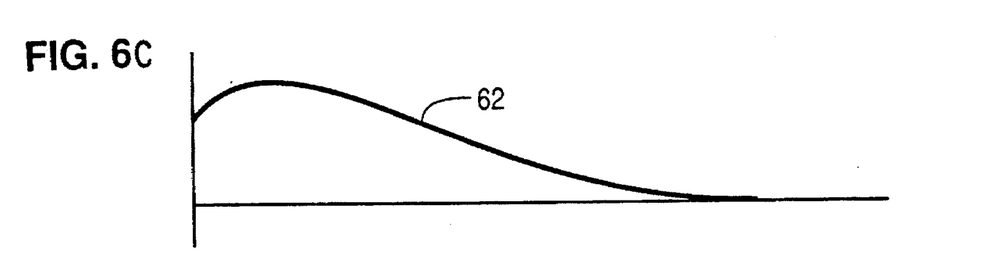

In a particular embodiment the processor 28 is programmed to analyze each spectrum obtained for the purpose of extracting from it a limited number of objective characteristics. For example, the frequency spectrum, which is shown by the curve 60 in FIG. 6, consists of a discrete set of values, for example 512 values. This spectrum can be broken down into a "base noise" 62 onto which "peaks" 64a, 64b, 64c and 64d have been added. In the example shown, the four peaks can each be characterised by the frequency of the maximum of the peak, the amplitude of the peak and the width of this peak fixed for example at −3 dB or at any other value chosen in advance.

The "base noise" can be obtained either empirically by the analysis, in delayed time, of all the spectra obtained by the processor 28, or in any other way. In one embodiment, the "base noise" is recorded in a part of the memory 26; which makes it possible to determine easily, by subtraction, a spectrum of "peaks" of the current spectrum. After determination of the spectrum of peaks, the frequencies for which there exists a maximum, the amplitude of this maximum and the corresponding width of the peak are determined by any known means. It is obvious that the peak spectrum which is obtained by subtraction contains positive and negative amplitudes and that account will be taken only of values greater than a given threshold for the positive values. The negative values below a given threshold represent the disappearance of one or more frequencies.

In order to characterize the peaks, first of all the frequency zones for which the values of the peak spectrum are all greater than a given threshold are determined, which makes it possible to enumerate the peaks present in the spectrum. Then for each zone the maximum value and the frequency for this maximum value are determined. Then the width of the peak is determined. For the sake of greater simplicity, the zone for which the frequencies of this peak are greater than the threshold can be taken as the width. It may be useful to know the minimum frequency and maximum frequency either by preserving these two values or by preserving the median and the frequency standard deviation. In other embodiments a knowledge of the mean frequency may be of interest. All these types of calculation may be accomplished easily by the processor 28 since its programming can be introduced into an EPROM memory 27.

Each spectrum can thus be characterized by a limited number of values referred to as objective characteristics. The objective characteristics of each spectrum are recorded in the memory 26. Once the spectra have been characterized, the processor 28 compares the objective characteristics of the last spectrum or signature of the spectrum with determined constraints or template.

Figure 7:
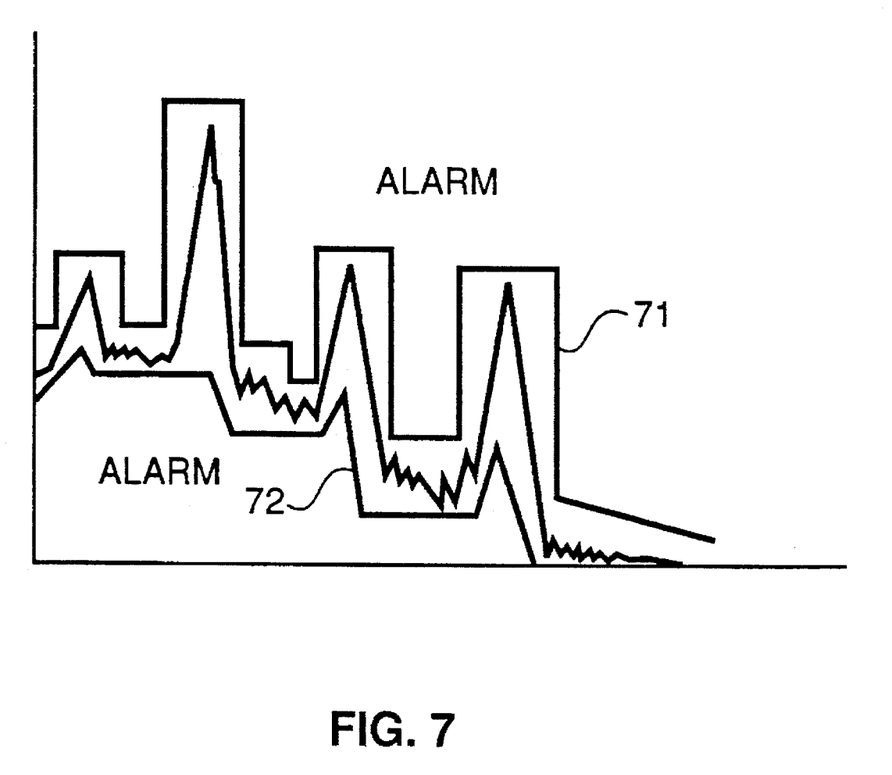
FIG. 7 shows diagrammatically the framing of a spectrum by upper and lower thresholds enabling operating abnormalities to be detected.
Figure 8:
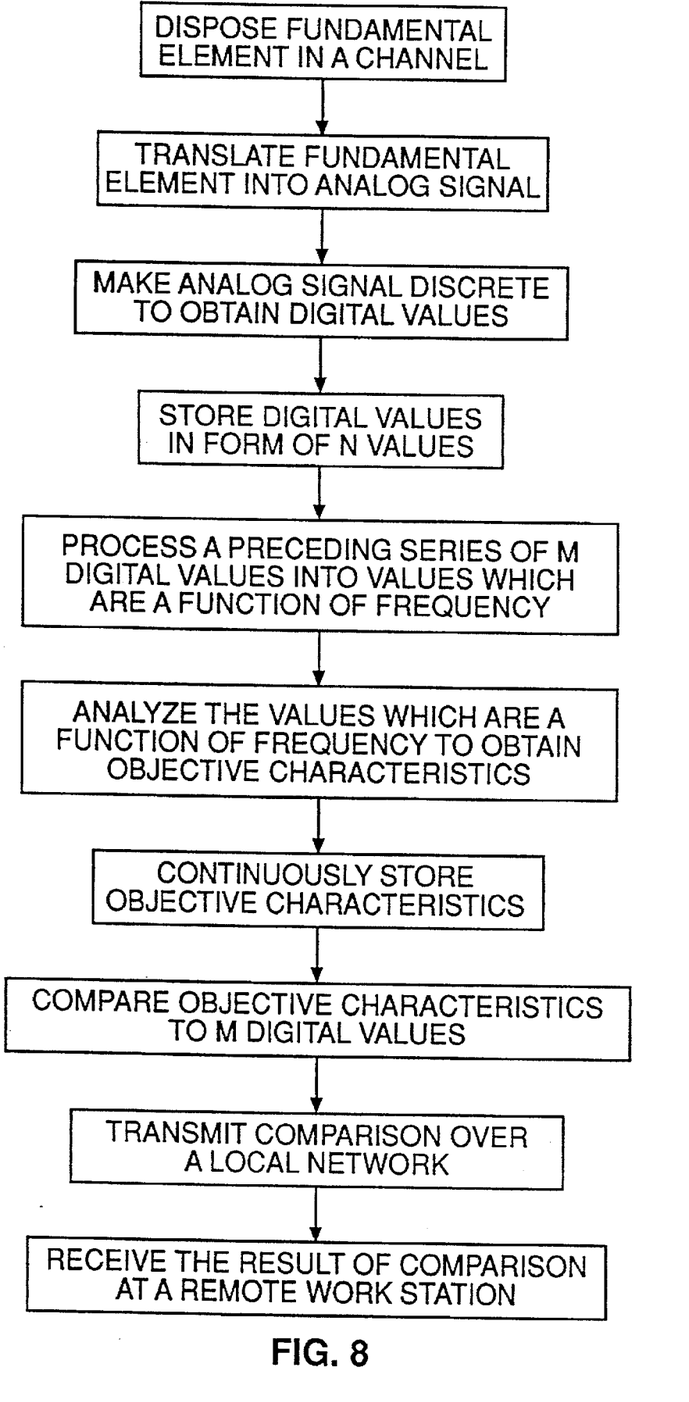
FIG. 8 shows a flowchart of the method according to the present invention.

As can be seen in FIG. 7, the processor 28 is able to verify that the objective characteristics are included within a template, that is to say between a top threshold and bottom threshold, that the frequency corresponding to the maximum varies between two given limits and that the width of the peak is less than a given value. It is obvious that the processor 28 can be programmed so as to verify other possible conditions. When one of the conditions is not verified, the processor 28 supplies an alarm signal which is transmitted by the network to the supervisor 12a.

It is obvious that the processor 28 can be programmed so as to compare the objective characteristics with intermediate thresholds or an alert threshold. The state of alert can be transmitted to the monitor 12a or can be used by the processor 28 so as to trigger an alarm when the frequency or any other parameter which has triggered the alert signal has not regained a state considered to be normal at the end of a certain given period.

In different embodiments, the processor 28 can be programmed to carry out and record a monitoring of the amplitudes of the various frequencies of the peaks. It can also carry out a monitoring of frequency shifts in the peaks and detect the appearance or disappearance of peaks. It is obvious that, according to the programming of the processor 28, these phenomena can be signalled to the monitor 12a.

Advantageously, some channels can be designed so as to provide an alarm signal to the monitor 12a when the level of the analog signal monitored passes from a first level to a second level separated from the first by a quantity greater than a threshold in a time less than a given period.

The only constraint relating to the programming of the processor 28 is that, as shown diagrammatically in FIG. 4, the duration necessary for carrying out: a) the transformation of the M samples into a spectrum representing the frequency variations, b) the storing of the spectrum, c) the analysis of this spectrum to obtain the objective characteristics, d) the storing of the objective characteristics and the comparison of the said characteristics and the N acquisitions of each of the N samples, should be less than the period necessary for the appearance of the Nth sample, that is to say N×1/Fe.

Reference will now be made to FIG. 3, which shows the circuit 22 for transforming the analog signal into a succession of digital values representing the analog signal, also referred to as the digital signal. The analog signal coming from the sensor 20 arrives at the input of a programmable gain amplifier 30 by means of a command logic 31 so as to be able to be adapted to the level of the signal received. The signal, once amplified, passes through an anti-aliasing filter 32 in order to meet the Shannon conditions. Advantageously, the cutoff frequency of the low-pass anti-aliasing filter can be programmed by means of a programmable oscillator 33, which supplies not only the anti-aliasing filter control frequency but also the sampling frequency Fe. The sampling frequencies Fe and cutoff frequencies Fc are chosen in a way well known to a man skilled in the art in order to limit the noise to an acceptable level. This sampling frequency is transmitted to the holding input of an analog-to-digital converter 24, which, at its other input, receives the amplified and filtered analog signal. The analog-to-digital converter 24 is a converter which supplies, with a very short conversion time, output signals which are coded in 12 bits so as to obtain sufficient accuracy.

In a preferred embodiment the transformation circuit 22 comprises other elements which make it possible to take account of the parameters influencing the measurement. In fact a vibration sensor may have at the output, for the same vibration, a first amplitude when it functions at a first temperature and a second, different amplitude when it functions at a second temperature. Each influencing parameter is measured by a sensor and its signal is sent to the circuit 22. The signals representing the influencing parameters are amplified by amplifiers 30a, 30b, and then filtered by low-pass filters 32a, 32b serving as anti-aliasing filters, and reach respectively analog-to-digital converters 24a, 24b. These auxiliary converters and anti-aliasing filters do not need to have such a high performance as the converter and filter used for the principal measurement. In particular, the conversion accuracy may be limited to 8 bits or less. In addition, the conversion times do not need to be short since the parameters influencing the measurement vary only slowly with respect to the sampling frequency of the principal signal.

The digital signal corresponding to the measurement and the signals corresponding to the influencing parameters are transmitted to the processor 28, which if necessary makes corrections to the measurement signal before storing it. The corrections made to the measurement signal are stored in tables contained in the read-only memory 27 and dependant on the value of the influencing parameters. The processor 28 is programmed so as to verify, episodically and by way of check, the values of the influencing parameters in order to choose the correction table accordingly. Thus a bit representing the quality of the measurement can be associated with the digital value of the measurement: for example a "0" will indicate that the measurement has been carried out under normal conditions of operation and a "1" will indicate that at least one of the influencing parameters was outside the limits and that no table was associated with it.

Reference will now be made once more to FIG. 1 to study the functioning of the monitors 12a and 12b and their possible programming. The monitor 12a receives not only the information coming from each channel but is also connected to various components of the machine in order to have knowledge of their state. In a preferred embodiment the monitor 12a receives the information relating to the state of the various components of the machine either directly from the control station for these components or from the machine control computer through a link 17 or from the network 10. The monitor 12a is thus able to correlate the information sent by the channels Ci directly with the indexed events in the manufacturing process, for example the start up of the machine, change in product to be manufactured, opening of a valve, start up of a fan, change in output of a pump, etc. The monitor 12a is thus able to determine whether the phenomenon observed by the sensor for the channel Ci is a normal event or constitutes aberrant behaviour which requires more attention. If the event is considered to be normal, the monitor 12 does no more than accept the alarm signal sent by the channel Ci. When the behavior of the phenomenon observed by the sensor for the channel Ci is considered, by the monitor 12a, to be aberrant, the monitor sends to the processor 28 for the channel Ci a command for the repatriation of data. It is obvious that it can be advantageous to repatriate the data contained in each of the channels in order to be able to analyze, in delayed time, the operating conditions which have led to this alarm condition, taking account of the phase shifts due to the propagation of the product in the machine.

As indicated above, the values of the signal, the spectra and the objective characteristics of the spectra were stored in the memory 26. Advantageously, the memory 26 is organized so as preserve the values for a period of approximately 1 to 2 minutes depending on the manufacturing process; this makes it possible to supply to the monitor 12a, at its request, a history of the phenomenon observed. Once the historic information has been received, the monitor can analyze it or present it to a skilled person so that the course of action to be taken can be deduced from it. It is obvious that each channel contains a history peculiar to its sensor and that the supervisor 12a may request the transmission of data to several channels in order to be able to determine more easily the course of action to be taken when an aberrant phenomenon is detected.

The monitor 12a is able to receive, in real time, succinct information originating from the various channels Ci. Depending on the programming of each of these channels, the latter can transmit over the network at least some of the objective characteristics. The monitor 12a can thus analyze in real time the information coming from the channels Ci or can correlate in real time the information relating to separate channels so as to verify similarities or like behaviors which, if they do not occur, will enable an alarm to be triggered.

It is advantageous for the equipment to be programmed to record, in the database 14, the spectra and objective characteristics of the various channels when the monitor 12a detects an aberrant behaviour.

The monitor 12b is used essentially as a data manager and server. It makes it possible to record all the transactions between the monitor 12a and the different channels, the diagnosis of the monitor 12a in the event of an alarm being sent by one of the channels, the type of product manufactured, and the configuration of the machine and any subsequent modifications to it. The monitor 12b makes it possible, through the network 16, to receive requests from users desiring to have access to the database 14 and to transmit these data to the said user for the purpose of analysis of the history or of the present by a skilled operator.

As indicated above, the monitor 12b can be programmed to send requests periodically over the network 10 for the purpose of recording the various "statistical" spectra calculated in each channel. These spectra make it possible to take account of long-term modifications. They can also be used not only to establish the state of wear of the machine and to provide and optimise maintenance, but also to determine statistically the "base noise" of the machine.

In an advantageous embodiment, the control program for the processor 28, instead of being contained in an EPROM 27, is contained in a RAM (not shown). This special structure makes it possible to load the RAM directly from the monitor 12a through the network 10. This makes it possible to modify the type of computation, the analyses and the comparisons carried out by the processor 28.

As shown in FIG. 1, the network 10 is also connected to actuators $A_1, A_2, \ldots, A_p$, which make it possible to use control devices for the machine. The monitor 12c communicates with the monitor 12a and may comprise an expert system for, on receipt of data coming from the supervisor 12a, utilising the appropriate actuators Ai.

The actuators Ai (FIG. 3B) have a structure similar to the channels Ci in which the sensors 20 are replaced with motors 20' or similar, often referred to in the art as actuators. Each actuator Ai transmits the commands from the network 10 to the motor 20', passing through a processor 28'. The circuit 22' is similar to the circuit 22 in which the components 30, 31, 32, 33 and 24 of the acquisition channel are replaced by circuits 32', 30', 31' for controlling the motor. The sensors for the influencing parameters verify that the motor has indeed carried out the commands sent to it by the processor 28'.

Figure 3B:
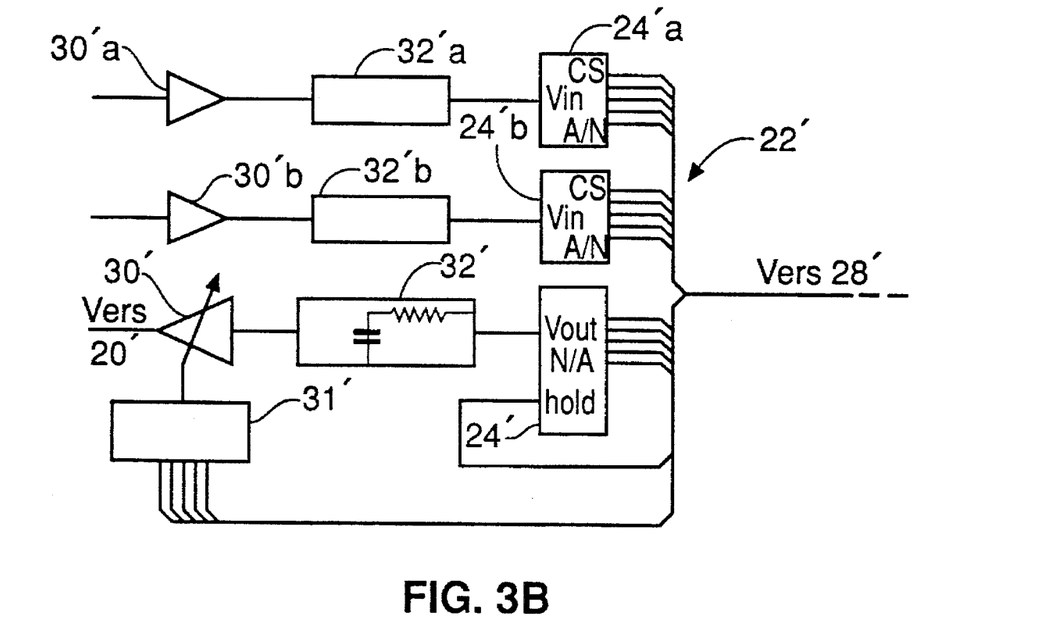
FIG. 3B shows diagrammatically part of an actuator useful to the invention.

The mode of functioning of the actuators Ai is considered to be the reverse of the mode of functioning of the acquisition channels Ci and is characterized in that the objective parameters supplied by the monitor 12c are used by any inverse spectral analysis means (inverse FFT, for example) with precise control of the phase (to avoid any hunting phenomenon) so as to generate an analog signal, the spectral components of which tend to minimize the frequencies interfering with the product. In one advantageous embodiment the digital-to-analog converter 24' may be replaced by a PWN pulse width converter.

The invention as described previously provides equipment for the real-time monitoring of a large and complex machine. This monitoring makes it possible to determine the conditions which have arisen during the manufacture of the product and makes it possible to assess the level of quality of the product manufactured and to infer from this which of the products should be eliminated.

I claim:

1. A method for continuously monitoring a complex manufacturing process of a material being transformed through a plurality of steps during a predetermined time period, in order to apprehend, in a continuous and complete manner, a transient or perturbing phenomena occurring during the manufacturing process, the method comprising the steps of:

disposing fundamental elements in separate channels situated in the immediate vicinity of a machine so that each fundamental element is continuously monitored by a sensor and connected to at least one remote work station, through a local network;

translating, within each channel in the immediate vicinity of the sensor, a fundamental element into an analog signal by means of a sensor fixed to the machine;

making, within each channel in the mediate vicinity of the sensor, the analog signal discrete with a frequency determined in relationship to the fundamental element associated with the channel in order to obtain a succession of digital values representing the instantaneous values of the analog signal as a function of the time;

storing, within each channel in the immediate vicinity of the sensor, the digital values corresponding to the analog signal in the form of series of N values, said digital values being accessible during the predetermined time period;

processing, within each channel in the immediate vicinity of the sensor, a preceding series of M digital values where M>N, the processing of the preceding series of M digital values being carried out by the use of spectral estimation techniques making it possible to transform the signal variations with respect to time into values which are a function of the frequency, and then storing the values which are a function of the frequency;

analyzing, within each channel in the immediate vicinity of the sensor, the values which are a function of the frequency in order to obtain objective characteristics depending on the series of M digital values processed and the number of characteristics of which is less than N;

continuously storing, within each channel in the immediate vicinity of the sensor, the objective characteristics;

comparing, within each channel in the immediate vicinity of the sensor, the objective characteristics corresponding to the series of M digital values either with given values or with the objective characteristics corresponding to one or more of the preceding series so as to provide a result of the comparison;

transmitting, within each channel in the immediate vicinity of the sensor, the result of the comparison over the local network;

receiving, at the remote work station, the result of the comparison for each channel for the purpose of observation and use in real time with optionally storing of the results of the various comparisons in each channel, the objective characteristics, and the series of N digital values so as to be able to carry out subsequently an analysis in delayed time over all the fundamental elements of the complex process; and transferring, upon reception of an abnormal result of the comparison from any of the channels, from each of the channels to the remote work station the digital values stored during the predetermined time period and representing the instantaneous state of the fundamental elements as a function of time in order to time correlate each signal having occurred at the time the material experienced the fundamental element monitored by the respective sensor.

2. The method according to claim 1 characterized in that the spectral estimation techniques use the Fourier transform.

3. The method according to claim 2, further comprising the step of filtering the values of the samples processed by means of a Hanning window.

4. The method according claim 2, further comprising the step of filtering the values of the samples processed by means of a Blackman window.

5. The method according to claim 1, further comprising the step of filtering the values of the samples processed by means of a Hanning window.

6. The method according claim 1, further comprising the step of filtering the values of the samples processed by means of a Blackman window.

7. Equipment for the continuous monitoring of a complex manufacturing process of a material being transformed through a plurality of steps, during a predetermined time period, in order to apprehend, continuously and completely, transient or perturbing phenomena occurring during this process, process equipment comprising:

a) at least one remote work station designed to receive signals in real time making it possible to analyze or observe the state of the manufacturing process;

b) a local network designed to convey information to the remote work station;

c) a plurality of channels each associated with a fundamental element of the manufacturing process, each channel comprising:
1) a sensor enabling the fundamental element associated with it to be monitored continuously and continuously transforming the state of the fundamental element into an analog signal, the channels being disposed in the immediate vicinity of the sensor;
2) an analog-to-digital converter situated in the immediate vicinity of the sensor and receiving the analog signal in order to transform the analog signal into a succession of digital values representing the instantaneous state of the fundamental element as a function of time;
3) a signal processing device for simultaneously storing the succession of the digital values, during the predetermined time period, in the form of a series of N values and processing the digital values corresponding to a preceding series of M digital values for the purpose of transforming the time-dependent variations represented by the succession of M digital values into signals representing the frequency-dependent variations of the analog signal, and then, after processing, storing the signals representing the frequency-dependent variations;
4) an analyzer receiving the signals representing the frequency-dependent variations in order to transform them into a limited number, less than N, of objective characteristics;
5) a memory for continuously storing the objective characteristics corresponding to a given number of series of M digital values; and
6) means for comparing the objective characteristics either with given values or with the objective characteristics corresponding to one or more series of M previous signals so as to provide a result of the comparison and transmit the result over the local network; and d) means at the remote work station to detect an abnormal result of the comparison so that, upon reception of the abnormal result of the comparison, the digital values stored during the predetermined time period and representing the instantaneous state of the fundamental elements as a function of time of each of the channels is transferred to the remote work station to time correlate each signal having occurred at the time the material experienced the fundamental element monitored by the respective sensor.

8. Equipment according to claim 7, characterized in that the signal processing device transforming the time-dependent variations into frequency-dependent variations comprises means for obtaining a discrete Fourier transform.

9. Equipment according to claim 8, characterized in that the signal processing device transforming the time-dependent variations into frequency-dependent variations comprises means for altering the series of M successive digital values of samples, either according to a Blackman function or according to a Hanning function.

10. Equipment according to claim 7, characterized in that the signal processing device transforming the time-dependent variations into frequency-dependent variations comprises means for altering the series of M successive values of samples, either according to a Blackman function or according to a Hanning function.

* * * * *